United States Patent [19]

Stevenson

[11] 4,439,006
[45] Mar. 27, 1984

[54] LOW COST ELECTRO-OPTICAL CONNECTOR

[75] Inventor: David W. Stevenson, Mesa, Ariz.

[73] Assignee: Motorola, Inc., Schaumburg, Ill.

[21] Appl. No.: 264,764

[22] Filed: May 18, 1981

[51] Int. Cl.³ .............................................. G02B 7/26
[52] U.S. Cl. .................................. 350/96.20; 357/30; 357/72
[58] Field of Search ................ 350/96.20; 250/227; 357/30, 72, 74

[56] References Cited

U.S. PATENT DOCUMENTS

| | | | |
|---|---|---|---|
| 3,517,981 | 6/1970 | Rueger et al. | 350/96 C |
| 3,806,225 | 4/1974 | Codrino | 350/96.20 |
| 4,024,570 | 5/1977 | Hartmann et al. | 357/74 |
| 4,032,963 | 6/1977 | Thome | 357/74 |
| 4,076,376 | 2/1978 | Slaughter | 350/96.21 |
| 4,136,357 | 1/1979 | Frederiksen | 357/74 |
| 4,182,545 | 1/1980 | Greer | 350/96.20 |
| 4,186,995 | 2/1980 | Schumacher | 350/96.20 |
| 4,186,996 | 2/1980 | Bowen et al. | 350/96.20 |
| 4,329,190 | 5/1982 | Berg et al. | 357/17 |

OTHER PUBLICATIONS

Albanese et al., *Bell System Technical Journal*, vol. 58, No. 3, Mar. 1979, pp. 713–720, "LED Array Package for Optical Data Links".

Noel et al., *IBM Tech. Disclosure Bull.*, vol. 22, No. 11, Apr. 1980, pp. 4857–4858, "High Density Fiber-Optic Transducer Modules".

Redmond, *IBM Tech. Disclosure Bull.*, vol. 22, No. 9, Feb. 1980, pp. 3975–3976, "Completely Integrated Fiber-Optic Link".

Primary Examiner—John D. Lee
Assistant Examiner—Frank Gonzalez
Attorney, Agent, or Firm—Paul F. Wille

[57] ABSTRACT

A low cost electro-optical device is disclosed in which a plastic encapsulated, electro-optical semiconductor device is provided with an aperture into which a segment of optical fiber can be inserted. A suitable connector member is also described.

9 Claims, 6 Drawing Figures

LOW COST ELECTRO-OPTICAL CONNECTOR

BACKGROUND OF THE INVENTION

This invention relates to electro-optical semiconductor devices in plastic packages for providing very low cost interfaces to optical fiber transmission lines.

As used herein, "electro-optical" means a device which converts electric current to light and/or vice-versa. "Light" refers to those wavelengths of electromagnetic radiation to which semiconductive material is, or can be made, sensitive, whether or not such light is actually visible to the unaided human eye. "Optical fiber" refers to single or multi-strand light guides.

In the last decade, the cost of copper wire relative to optical fiber and the increasing use of computers in new applications has increased the need for a very low cost electro-optical devices to interface the computer to various I/O (input or output) devices. Among the many possible applications, those where the computer and the I/O device are separated by no more than about one hundred meters represent a group of applications where cost rather than optical performance is paramount. Two of these are, for example, the "wiring" harness in an automobile and the interconnections between a computer and I/O devices, or other computers, in an office or factory.

There have been many electro-optical semiconductor devices proposed in the literature. A considerably smaller number are in actual use. These devices are typically designed with optical performance as the prime consideration.

While providing the desired optical performance, these devices comprise a great number of parts which are expensive to fabricate and assemble. A recently introduced device employing fewer parts, viz. a ferrule package, a segment of optical fiber, an electro-optical semiconductor device, and a header commonly used for other devices, achieves superior optical performance at reduced cost. However, even this device may be too costly for extremely cost sensitive applications, as for example in the automotive market.

Even though cost is paramount, other characteristics cannot be ignored. For example, the device must be easy to use, achieve a modicum of optical performance, and not require a connector whose cost nullifies the savings obtained from the device.

In view of the foregoing, it is therefore an object of the present invention to provide a low cost electro-optical semiconductor device.

Another object of the present invention is to provide an electro-optical semiconductor device compatible with an inexpensive connector to optical fiber transmission lines.

A further object of the present invention is to provide a electro-optical device having a commonly used package configuration, thereby being compatible with existing manufacturing equipment and requiring little special tooling.

Another object of the present invention is to provide an inexpensive connector for optical fiber transmission lines.

A further object of the present invention is to provide an inexpensive connector for securely attaching to an electro-optical device in accordance with the present invention, yet being easily released when desired or to protect the electro-optical device from undue stress.

Another object of the present invention is to provide an inexpensive electro-optical device having an apertured package for aligning an optical fiber with the light emitting or light sensitive portion thereof.

SUMMARY

The foregoing objects are achieved in the present invention wherein a TO-92 type plastic package is adapted to receive the end of an optical fiber transmission line. Specifically, an aperture is provided in one side of the package whereby the fiber can be inserted into the package to a position aligned with the light emitting or light sensitive region of the semiconductive chip or die within the package. The package itself preferably has an asymmetric shape to obtain a singular position for which the connector will fit the device. The optical connection can be made through the side or the top of the package. The connector preferably comprises flexible latching means for engaging the package such that the connection can be broken when desired or necessary to protect the semiconductor device. The connector comprises a protruding portion of complementary shape to the aperture in the package for fitting therein. The optical fiber comprises or is within the protruding portion and is approximately aligned with the light emitting or light sensitive portion of the device. Fastening means are provided on the connector for securing the connector, eg. to a printed circuit board.

BRIEF DESCRIPTION OF DRAWINGS

A more complete understanding of the present invention can be obtained by considering the following detailed description in conjunction with the accompanying drawings, in which.

DETAILED DESCRIPTION

Figure 1:
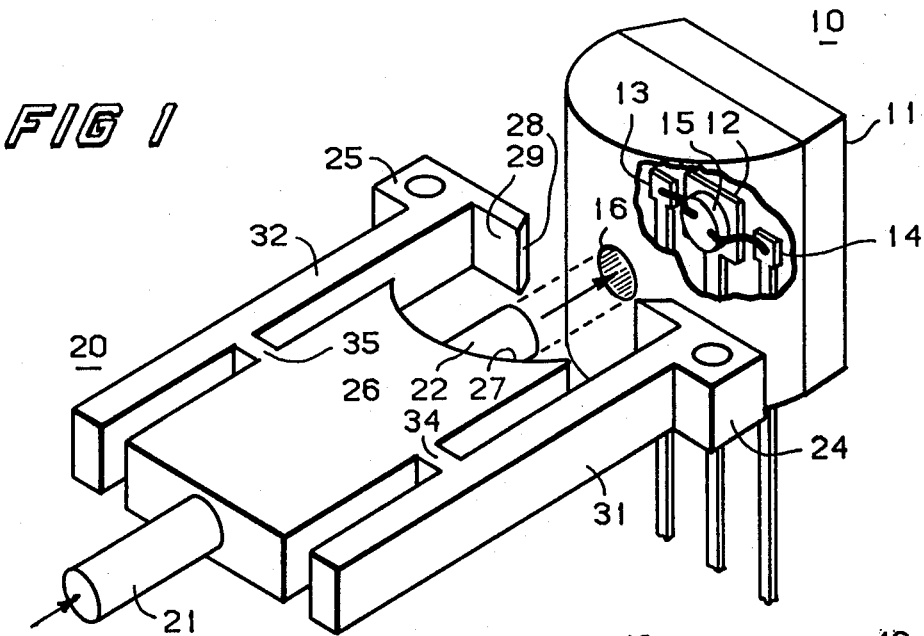
FIG. 1 illustrates in perspective the connector and electro-optical device in accordance with a preferred embodiment of the present invention.

FIG. 1 illustrates a preferred embodiment of the present invention wherein a single connector engages a single plastic encapsulated transistor. Specifically, semiconductor device 10 comprises package 11 partially surrounding leads 12, 13, and 14. While illustrated as comprising three leads, it is understood by those of skill in the art that the number of leads depends upon the type of device contained in device 10. Central lead 12 preferably comprises an enlarged portion at or near one end thereof to which is attached semiconductor die 15. The enlarged end portion of lead 12 serves both to mechanically support semiconductor die 15 as well as to provide an electrical connection thereto. Leads 13 and 14 are electrically connected to appropriate portions of semiconductor die 15 by suitable tie wires.

The fabrication of semiconductor device 10 is well known per se in the art. The only requirement of the present invention is that the semiconductor die be positioned on the side of lead 12 facing the convex portion of package 11. Package 11 is formed with bore 16 which extends from a position adjacent the photo-active area of the semiconductor die through to the outside surface of package 11. Semiconductor die 15 is not exposed to ambient since the surface thereof is coated with a die coat prior to being encapsulated by package 11.

Connector 20 is designed to surround a portion of package 11 and to releasably attach thereto by way of flexible locking means which, with fiber 22 inserted in bore 16, positions the optical fiber adjacent the photo-active area of semiconductor die 15. Optical fiber transmission line 21 is terminated by connector 20 and may extend therethrough and emerge as fiber 22. Alternatively, fiber 22 may comprise a thin plastic shell surrounding optical fiber 21 thereby further strengthening it. Ends 24 and 25 engage the flat portion of package 11 by way of extensions 28 which define shoulders 29 on each of arms 24 and 25. Extension 28 need not end parallel to fiber 22 but instead may be tapered slightly to ease the attachment of connector 20 to case 11. Similarly, shoulder 29 need not be orthogonal to fiber 22 but may be tapered slightly to ease the release of connector 20 from package 11.

Connector 20 comprises a central body 26 surrounding the end portion of optical fiber transmission line 21. Arms 31 and 32 extend parallel to optical fiber 21 and are attached along the length thereof by flexible portions 34 and 35, respectively. Because arms 31 and 32 are attached at a point along their length rather than at either end, flexible portions 34 and 35 function both as an attaching mechanism and as a pivot about which arms 31 and 32 can rotate.

Specifically, connector 20 is readily attached by firmly grasping arms 31 and 32 at a point away from the end of fiber 21 such that squeezing the connector separates ends 24 and 25, thereby permitting the connector to be easily attached to package 11. Central body portion 26 further comprises a concave portion 27 having a shape complementary to the shape of package 11. By virtue of the shape of surface 27, the positioning of extension portion 22 within bore 16, and the fitting of shoulder 29 against the flat portion of package 11, connector 20 is securely attached to semiconductor device 10. The security of the attachment notwithstanding, connector 20 is readily released by spreading ends 24 and 25. To further stabilize the connector and semiconductor device combined, bores are provided in ends 24 and 25 to facilitate attachment of the connector, e.g. to a printed circuit board.

Figure 2:
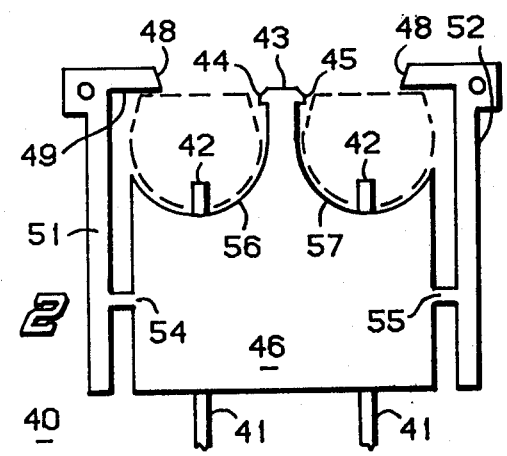
FIG. 2 illustrates in cross-section an alternative embodiment of the present invention.

FIG. 2 to illustrates an alternative embodiment of the present invention wherein a pair of electro-optical semiconductor devices are mechanically connected together and wherein each is connected to a dual optical fiber transmission line. Specifically, connector 40 comprises a central body portion 46 having arms 51 and 52 generally parallel to the sides thereof and extending outwardly in a direction parallel to the axes of the optical fibers. Arms 51 and 52 have inwardly extending ends 48, defining a shoulder 49 for engaging a semiconductor package. Between the semiconductor devices, projection or septum 43 is provided which extends outwardly further than the remainder of body portion 46. Septum 43 is preferably provided with small projections 44 and 45 for mechanically securing the semiconductor devices. Body portion 46 further comprises contoured surfaces 56 and 57 complementary to the shape of the semiconductor devices to be inserted therein. As with the embodiment illustrated in FIG. 1, optical fiber 42 extends into the volume defined by connector 40 for engaging the bore within the semiconductor device. As with the single fiber connector illustrated in FIG. 1, connector body 46 is connected to arms 51 and 52 by flexible coupling members 54 and 55. These coupling members function in the same manner as described previously to provide both a pivot and a connection between central body 46 and arms 51 and 52.

While illustrated in FIG. 2 as comprising two sockets for receiving semiconductor devices, it is understood that connector 40 can be expanded to enable one to connect a plurality of semiconductor devices simultaneously. In this case, a plurality of septums are provided, giving the upper portion of connector 40 a scalloped shape.

Figure 3:
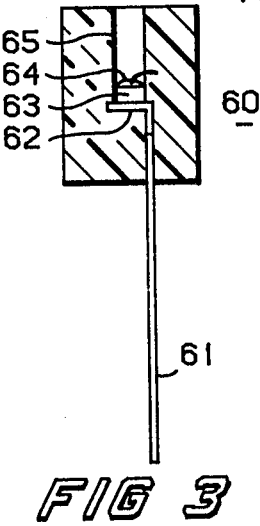
FIG. 3 illustrates one embodiment of a connector having an asymmetrical shape.
Figure 4:
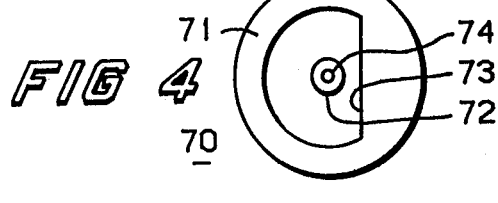
FIG. 4 illustrates another embodiment of a connector having an asymmetrical shape.

FIG. 3 illustrates an alternative embodiment of the present invention wherein the optical coupling is provided through the top surface, i.e. the surface opposite the leads, of the semiconductor device. Specifically, semiconductor device 60 comprises a central lead 61 having mounting portion 62 turned at right angles to the axis of leads 61. Semiconductor die 63 is attached to mounting portion 62 with the photo-active area thereof facing upwardly. Die coat 64 covers and protects the upper surface of die 63 and can comprise any suitable, transparent, die coat. The photo-active area of semiconductor die 63 is aligned with the bottom of bore 65, which receives the optical fiber transmission line from the connector.

In this configuration, connector 70 comprises a cylindrical portion 71 defining a central volume into which optical fiber 72 projects a predetermined distance. Optical fiber 72 projects a distance such that, when connector 70 fully engages semiconductor device 60, optical fiber 72 is at or very near the bottom of bore 65. As with connectors 20 and 40, optical fiber 72 may be either the end portion of an optical fiber transmission line or may include a plastic sleeve formed of the same plastic as connector 70 and through which the optical fiber transmission line extends.

Figure 5:
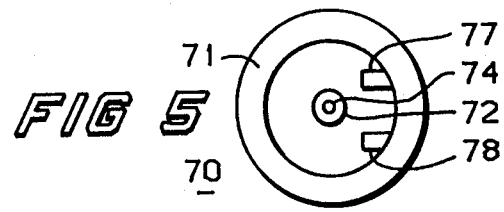
FIG. 5 illustrates another embodiment of the present invention wherein a plurality of semiconductive devices are joined by a single connector.

Cylindrical portion 71 includes a flat surface portion for singularly engaging semiconductor device to thereby provide an oriented connection. While cylindrical portion 71 can define a shape complementary to that of transistor 60, an oriented connected can also be obtained by molding appropriate ridges 77 and 78 within the volume defined by cylindrical portion 71, as illustrated in FIG. 5. Although the use of a single optical fiber may not require an oriented connection, such is required where more than one fiber is used either in a single semiconductor device or for a plurality of devices mechanically joined in a single connector.

Figure 6:
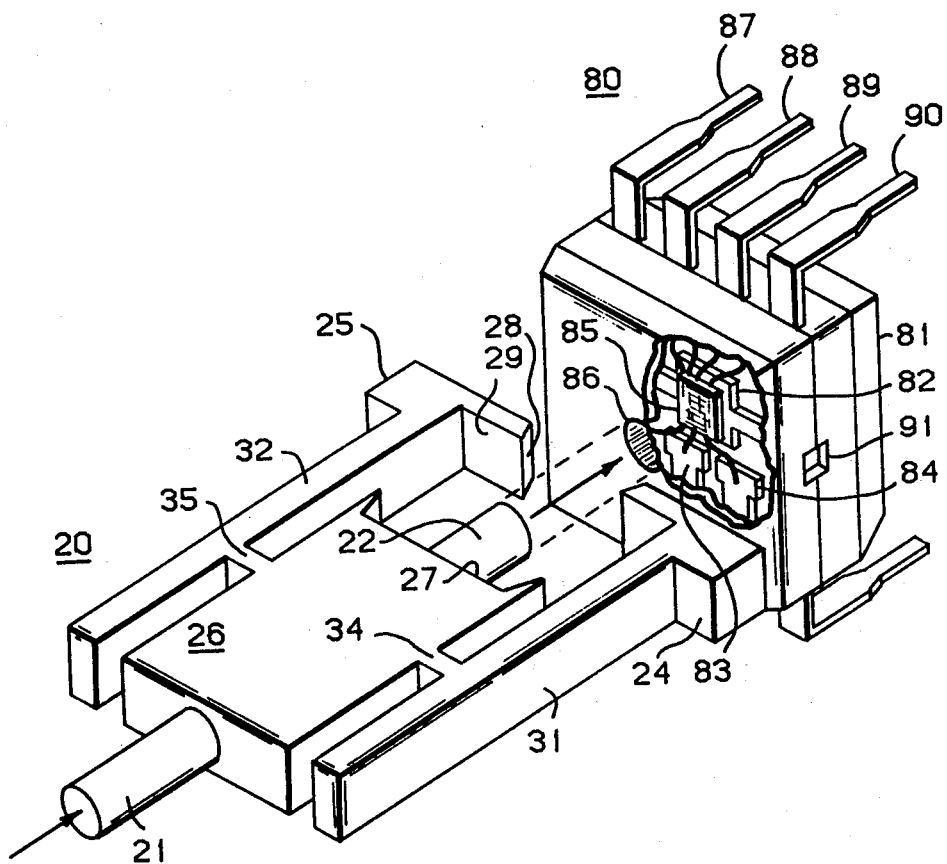
FIG. 6 illustrates an alternative embodiment of the present invention using a dual in-line package (DIP).

In some applications it may be desired to use a more complex or sophisticated chip having several active devices as well as a photo-active area, for example to perform signal processing. In such case, a semiconductor device in accordance with the present invention may conveniently comprise a multi-lead, dual in-line plastic package. As illustrated in FIG. 6, optical fiber transmission line 21 is connected to semiconductor device 80 by way of connector 20. This connector is the same as that described in FIG. 1 wherein like elements bear the same reference numeral.

Semiconductor device 80 comprises a dual in-line package 81 having a first set of leads 82-84 extending outwardly therefrom in a first direction and a second set of leads 87–89 extending outwardly therefrom in a generally opposite direction. Approximately centrally located between the inner ends of the two sets of leads is semiconductor die 85 which is mounted on a central lead or support member. The inner ends of the two sets of leads are connected to respective bonding areas on semiconductor die 85 by suitable tie wires.

Semiconductor die 85 comprises a photo-active area among the various active devices also formed on the chip. The photo-active area is aligned with bore 86, which receives fiber 22 from connector 20 and is generally orthogonal to the plane of the leads. Extensions 28 on end portions 24 and 25 of arms 31 and 32 may engage the underside of package 81 or, preferably, engage recess 91 formed in opposite sides of package 81. In so doing, connector 20 is thereby securely attached to package 81 and provides adequate coupling between optical fiber transmission line 21 and the photo-active area on semiconductor die 15.

The plastic used to form packages 11 and 81 or connectors 20, 40, and 70 may comprise any suitable plastic. It is preferred that the plastic not be transparent to minimize spurious signals caused by stray light. The plastic for the packages must be translucent at some predetermined thickness, however, so that light can be coupled therethrough between the optical fiber transmission line at the bottom of the bore in transistor 10. Suitable, generally opaque plastics for this are known as novalac plastics; e.g. Fiberite EB409C or Hysol MG17V. These are unpigmented and lightly filled (30–40%) with fused quartz. For the plastics named from the two manufacturers, a thickness of less than 0.25 mm (10 mils) is translucent. Alternatively, the package is molded of a translucent or transparent plastic and the connector is molded from an opaque plastic. The connectors in FIGS. 1 and 2 are then made at least as thick (as measured in a direction parallel to the leads from transistor 10) such that the semiconductor device is relatively shielded from stray light. An advantage of the embodiment illustrated in FIG. 3 is that connector 70 readily serves as a light shield since it substantially surrounds the entire body of transistor 60.

There is thus provided by the present invention and improved, extremely low cost fiber optic semiconductor package and connector. The connector is mechanically secure yet easily released from the semiconductor devices and provides adequate optical coupling to the photo-active device inside the package.

Having thus described the invention it will apparent to those of skill in the art that various modifications can be made within the spirit and scope of the present invention. For example, where package 11 comprises opaque plastic, a transparent insert can be used in bore 16 to eliminate the need for the fiber to project into the bore. This raises the cost of the device and reduces coupling efficiency while slightly simplifying the connection. A single device may comprise a chip having more than one active area or more than one chip, each having an active area. In such case, connector 20 has more than one fiber projecting from surface 27 and the device has more than one bore.

I claim:

1. A connector for coupling an optical fiber transmission line to the package of an electro-optical semiconductor device comprising:

a central body portion having a surface thereof complementary to the shape of said package;

a pair of arms positioned on either side of said central body portion and extending away from said surface to form a pincer-like enclosure for said package;

flexible coupling means interconnecting said central body portion and said arms so that said arms can move relative to said central body portion;

each arm having an end portion extending orthogonal to the arm and defining a shoulder portion for temporarily securing said connector to said package; and wherein said central body comprises optical fiber extending at least to said surface for optical connection to said semiconductor device.

2. The connector as set forth in claim 1 wherein said central body further comprises optical fiber means extending a predetermined distance from said surface.

3. The connector as set forth in claim 2 wherein said arms and said optical fiber means are approximately parallel.

4. The connector as set forth in claim 1 wherein said central body portion comprises two optical fibers and a septum for defining two locations, each for receiving a packaged electro-optical semiconductor device.

5. A low cost electro-optical semiconductor device, adapted for being easily connected to or disconnected from an optical fiber having a pincer-like connector on one end thereof for engaging said device, comprising:

a semiconductor chip having a photo-active area, a plurality of electrical leads having first ends thereof within said device and connected to said chip and the second ends thereof extending outwardly from said device in generally the same direction, and plastic package means for encapsulating said semiconductor chip and the first ends of said leads, said package having a flat surface portion on a side opposite the side said photo-active area faces for engaging said pincer-like connector and having a light transmissive portion between said photo-active area and a surface opposite said flat surface portion, wherein the arms of said pincer-like connector can engage the flat surface portion for temporarily holding said optical fiber adjacent said light transmissive portion of said package.

6. The device as set forth in claim 5 wherein said leads extend in a direction opposite said optical fiber.

7. The device as set forth in claim 5 wherein said direction is in a plane orthogonal to said fiber.

8. A low cost electro-optical semiconductor device, adapted for being easily connected to or disconnected from an optical fiber having a pincer-like connector on one end thereof for engaging said device, comprising:

an integrated circuit chip having a photo-active area, and a package enclosing said chip having recesses formed therein for engaging said pincer-like connector and having a light transmissive portion at least between said photo-active area and the outer surface of said package adjacent said photo-active area, wherein the arms of said pincer-like connector can engage said recesses for temporarily holding said optical fiber adjacent the light transmissive portion of said package.

9. The device as set forth in claim 8 wherein said device comprises more than one photo-active area.

* * * * *